(12) United States Patent
Tower et al.

(10) Patent No.: US 7,378,634 B2
(45) Date of Patent: May 27, 2008

(54) IMAGING METHODS AND APPARATUS HAVING EXTENDED DYNAMIC RANGE

(75) Inventors: John Robertson Tower, Yardley, PA (US); Peter Alan Levine, West Windsor, PA (US)

(73) Assignee: Sarnoff Corporation, Princeton, NJ (US)

( * ) Notice: Subject to any disclaimer, the term of this patent is extended or adjusted under 35 U.S.C. 154(b) by 66 days.

(21) Appl. No.: 11/189,650

(22) Filed: Jul. 26, 2005

(65) Prior Publication Data

US 2006/0022113 A1 Feb. 2, 2006

Related U.S. Application Data

(60) Provisional application No. 60/591,289, filed on Jul. 27, 2004.

(51) Int. Cl.
*H01J 40/14* (2006.01)
*H03K 23/46* (2006.01)
*H04N 3/14* (2006.01)

(52) U.S. Cl. .................. 250/207; 377/60; 348/311

(58) Field of Classification Search .............. 250/207, 250/214 VT; 313/103 CM, 103 R; 377/60; 257/236, 246; 348/311
See application file for complete search history.

(56) References Cited

U.S. PATENT DOCUMENTS

| | | | |
|---|---|---|---|
| 3,953,733 | A | 4/1976 | Levine |
| 4,028,715 | A | 6/1977 | Emmons |
| 4,055,836 | A | 10/1977 | Weimer |
| 4,677,490 | A | 6/1987 | Levine |
| 5,337,340 | A | 8/1994 | Hynecek |
| 5,939,724 | A | 8/1999 | Eisen et al. |
| 6,472,653 | B1 | 10/2002 | Levine et al. |
| 6,570,158 | B2 | 5/2003 | Feygin |
| 7,053,809 | B2 * | 5/2006 | Hillis et al. ............. 341/155 |
| 2004/0016867 | A1 | 1/2004 | Milshtein et al. |

* cited by examiner

*Primary Examiner*—Georgia Y. Epps
*Assistant Examiner*—Brian J Livedalen
(74) *Attorney, Agent, or Firm*—Lowenstein Sandler PC

(57) ABSTRACT

Methods and apparatus for imaging light are disclosed. Light is imaged by collecting light, converting the collected light into a electrical charge signal, multiplying the electrical charge signal to produce multiple electrical charge signals with associated levels of gain, converting the electrical charge signals to voltage signals, and developing an output signal from one or more of the voltage signals that represents the collected light. The electrical charge signal may be multiplied using an electron multiplication device associated with multiple taps to produce the electrical charge signal with different levels of gain.

19 Claims, 3 Drawing Sheets

IMAGING METHODS AND APPARATUS HAVING EXTENDED DYNAMIC RANGE

CROSS-REFERENCE TO RELATED APPLICATION

This application claims the benefit of U.S. Provisional Application No. 60/591,289, filed Jul. 27, 2004, the contents of which are incorporated herein by reference.

FIELD OF THE INVENTION

The present invention relates to imaging systems and, more particularly, to extending the dynamic range of imagers.

BACKGROUND OF THE INVENTION

Imagers collect photonic charge from an image using imaging devices such as charge coupled device (CCD) arrays. A typical CCD array incorporates photosensitive devices arranged in rows and columns to collect photonic charge. The photosensitive devices convert collected photonic charge into electrical charge. The electrical charge is then accumulated across multiple photosensitive devices, e.g., by row or column, to capture the image.

Imaging devices are able to handle a range of photonic charge that depends on their design. If the photonic charge incident on the surface of the imaging device is outside of this range, detail associated with an image is lost. There is an ever present desire for imagers having an improved photonic charge range to avoid loss of image detail. The present invention addresses this desire among others.

SUMMARY OF THE INVENTION

The present invention is embodied in methods and apparatus for imaging light. Light is imaged by collecting light, converting the collected light into an electrical charge signal, multiplying the electrical charge signal to produce multiple electrical charge signals with associated levels of gain, converting the electrical charge signals into voltage signals, and developing an output signal from one or more of the voltage signals that represents the collected light. The electrical charge signal may be multiplied using an electron multiplication device associated with multiple taps to produce the electrical charge signal with different levels of gain.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively, or to a non-specific one or more of the elements, the small letter designation may be dropped. The letter "n" may represent a non-specific number of elements. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1:
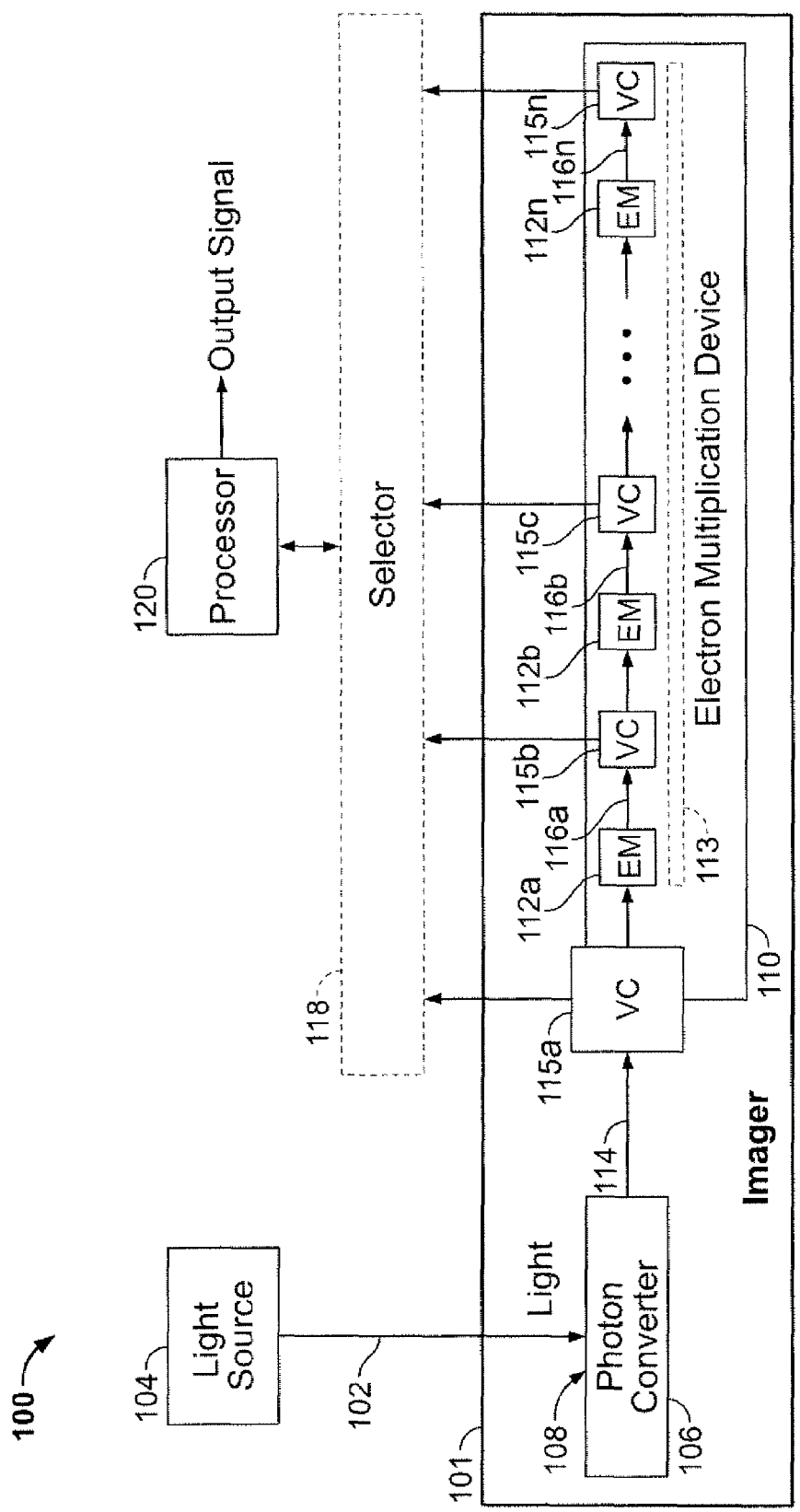
FIG. 1 is a block diagram of exemplary imaging apparatus in accordance with an aspect of the present invention.

FIG. 1 depicts exemplary imaging apparatus 100 for imaging light 102 from a light source 104. The light source 104 may be a scene from a surveillance camera, an image from a telescope, or an image of a scanned document. Other suitable light sources 104 that produce light 102 which can be imaged by the exemplary imaging apparatus 100 will be understood by one of skill in the art from the description herein.

A photon converter 106 of an imager 101 collects the light 102 and converts the collected light 102 into electrical charge. In an exemplary embodiment, the photon converter 106 is a charge coupled device (CCD) that converts the photons of the light 102 that impinge upon a surface 108 of the photon converter 106 into electrical charge. The photon converter 106 may be a single pixel, line array, area array, starring array, or a time delay and integrate (TDI) array. An exemplary starring array is described in U.S. Pat. No. 3,953,733 to Levine entitled METHOD OF OPERATING IMAGERS.

In an exemplary embodiment, the photon converter 106 is a TDI-CCD area array having an extended dynamic range (XDR). Suitable XDR TDI-CCD area arrays are described in U.S. Pat. No. 6,472,653 to Levine et al. entitled METHOD AND APPARATUS TO EXTEND DYNAMIC RANGE OF TIME DELAY AND INTEGRATE CHARGE COUPLED DEVICES and in U.S. patent application Ser. No. 11/070,418 to Levine et al. for SPECTROSCOPY IMAGER METHODS AND APPARATUS HAVING EXTENDED DYNAMIC RANGE.

Figure 2:
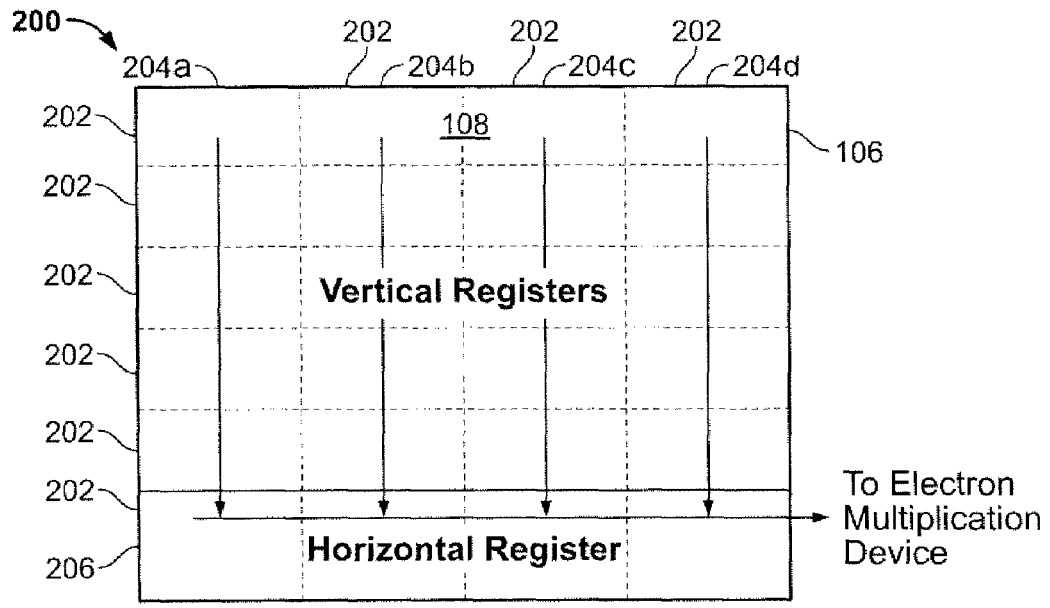
FIG. 2 is a conceptual illustration of an exemplary photon converter for use in the imager of FIG. 1.

FIG. 2 depicts a portion of an exemplary TDI-CCD area array 200 for use as the photon converter 106. The TDI-CCD area array 200 includes a plurality of charge coupled devices (referred to herein as cells) 202. In the illustrated embodiment, the cells 202 are arranged into a plurality of vertical registers (represented by vertical registers 204a-d) and a horizontal register 206. Each vertical register includes a plurality of cells 202 (i.e., six in the illustrated embodiment) and the horizontal register includes a plurality of cells 202 (i.e., four in the illustrated embodiment). The cells 202 in the vertical registers 204a-d of the illustrated embodiment are photosensitive devices that convert photons to electrical charge and systematically transfer the electrical charge into the cells 202 of the horizontal register 206. The cells 202 in the horizontal register 206 systematically transfer the electrical charge from the vertical registers 204a-d out of the photon converter 106 to an electron multiplication device 110 of the imager 101 (FIG. 1). For example, electrical charge may be transferred cell by cell from top to bottom out of each vertical register 204 into the horizontal register 206 and from left to right out of the horizontal register 206.

Referring back to FIG. 1, the electron multiplication device 110 is coupled to the photon converter 106 and multiplies the electrical charge provided by the photon converter 106. The electron multiplication device 110 includes one or more electron multiplication segments (represented by electron multiplication "EM" segments 112a-n) with each electron multiplication segment 112 having an associated gain. Further, each of the one or more electron multiplication segments 112 include one or more electron multipliers (not shown). Suitable electron multipliers for use in the present invention are described in U.S. Pat. No. 5,337,340 to Hynecek entitled CHARGE MULTIPLYING DETECTOR (CMD) SUITABLE FOR SMALL PIXEL CCD IMAGE SENSORS, which uses impact ionization to multiply electrical charge. In an exemplary embodiment, each electron multiplication segment has an associated multiplication gain control for setting the gain of that electron multiplication segment.

In the illustrated embodiment, the electron multiplication segments 112 are connected in series and progressively multiply the electrical charge from the photon converter 106. For example, a first electron multiplication segment 112a multiplies the electrical charge by a first level of gain and a second electron multiplication segment 112b multiplies the electrical charge as multiplied by the first electron multiplication segment 112a by a second level of gain, and so on. Thus, assuming the gain of each electron multiplication segment 112 is unity or greater, the electrical charge at an input terminal of the electron multiplication device 110 (or equivalently an output terminal of the photon converter 106) has the minimum amount of gain (e.g., unity gain) and the electrical charge after multiplication by the last electron multiplication segment 112n has the maximum level of gain, with optional intermediate levels of gain there between (e.g., between electron multiplication segments 112 if there are a plurality of electron multiplication segments 112). One or more optional lateral blooming drains 113 may be positioned along the electron multiplication segments 112 to prevent excess electrical charge from one of the segments from flowing into another one of the segments if the electrical charge exceeds the capacity of the electron multipliers within the electron multiplication segments 112 at some point during the multiplication of the electrical charge.

A plurality of taps are associated with the electron multiplication device 110 to produce the electrical charge provided by the photon converter 106 with different levels of gain. In an exemplary embodiment, a unity gain tap 114 is coupled to an input terminal of the electron multiplication device 110. The unity gain tap 114 produces the electrical charge without any multiplication. In addition, an electron multiplication tap (represented by electron multiplication taps 116a-n) is coupled to the output terminal of each electron multiplication segment 112. For example, a first electron multiplication tap 116a is coupled to the output terminal of a first electron multiplication segment 112a, a second electron multiplication tap 116b is coupled to the output terminal of the second electron multiplication segment 112b, etc. In alternative exemplary embodiments, one or more of the unity gain tap 114 and the electron multiplication taps 116 may be omitted.

Because the unity gain tap 114 provides the electrical charge without gain, its output signal covers the full dynamic range of the imager 100. Each progressive electron multiplication tap 116 provides an electrical charge signal with more electron gain, lower read noise, and less dynamic range. The inventors have determined that the output signal of the last tap 116n may be used to count individual electrons (or photons).

A plurality of voltage converters (represent by voltage converters "VC" 115a-n) are coupled to the taps 114/116 to convert the electrical charge signals at the taps 114/116 to voltage signals. Each voltage converter 115 is coupled to a respective one of the taps 114/116. The voltage converters 115 may be nondestructive readout devices 115 positioned at the input terminal of the electron multiplication device 110 and at the output terminals of each electron multiplication segment 112. In an exemplary embodiment, the nondestructive readout devices convert the electrical charge signals to voltage signals without diminishing the electrical charge signals. The nondestructive readout devices may be floating gate amplifiers. Other suitable techniques for converting electrical charge signals to voltage signals will be understood by one of skill in the art from the description herein.

In an exemplary embodiment, the last voltage convert 115n may be a floating diffusion electrometer. In an exemplary embodiment, the floating diffusion electrometer is selected such that the gain introduced by the electron multiplication device 110 outweighs the noise associated with the selected floating diffusion electrometer.

An optional selector 118 selects the voltage signals from one or more of the voltage converters 115 and couples the selected voltage signals to a processor 120 for use in developing an output signal representing the collected light 102. In an exemplary embodiment, the voltage signals from the voltage converters 115 are selected one at a time for use in developing an output signal. In an alternative exemplary embodiment, the voltage signals from two or more voltage converters 115 may be selected concurrently for use in developing a single output signal. The selector 118 may include a multiplexer that selects the voltage signals from one or more of the voltage converters 115 in response to a control signal received from the processor 120. Suitable methods for selecting the voltage signals from one or more of the voltage converters 115 will be understood by one of skill in the art from the description herein. In alternative exemplary embodiments, the selector 118 may be omitted and two or more of the voltage converters 115 may be coupled directly to the processor 120. The selector 118 may be integrated into the imager 101 or may be a separate component.

The processor 120 is coupled to one or more of the voltage converters 115, e.g., through the selector 118. In an exemplary embodiment, the processor 120 develops an output signal representing the collected light from the voltage signals of the one or more voltage converters 115 selected by the selector 118. In accordance with this embodiment, the processor 120 may generate a control signal that instructs the selector 118 to select the voltage signals from one or more of the voltage converters 115. The processor may generate the control signal based on a desired signal-to-noise ratio and/or dynamic range. In an alternative exemplary embodiment, the processor 120 develops the output signal from one or more voltage signals received directly from the voltage converters 115. Suitable processors 120 for use with the present invention will be understood by one of skill in the art from the description herein. The processor 120 may be integrated into the imager 101 or may be a separate component.

Figure 3:
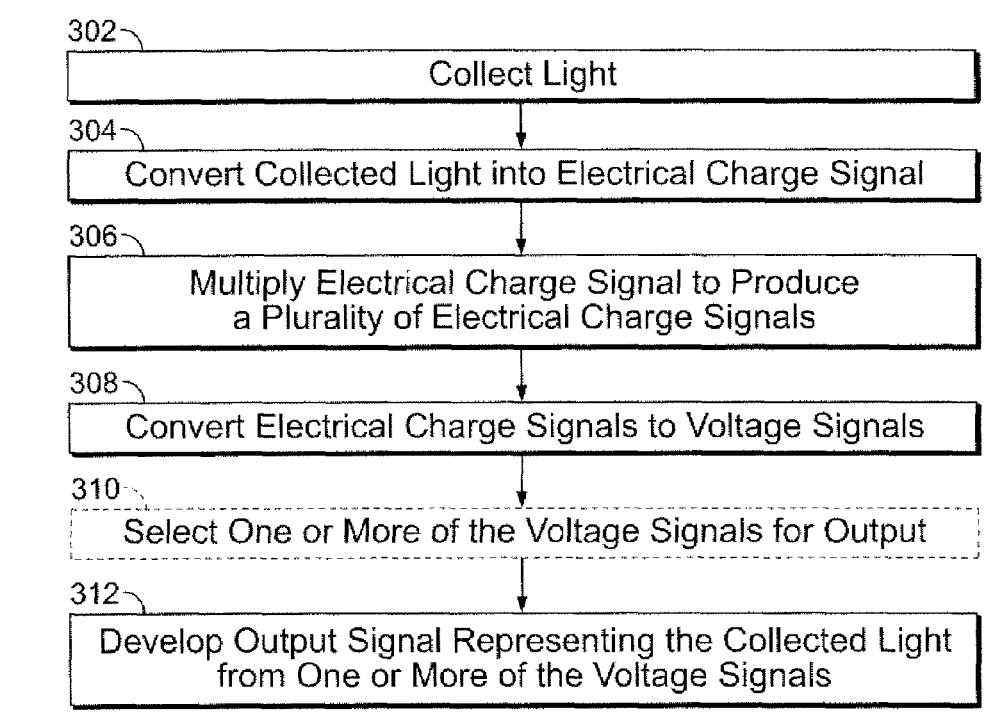
FIG. 3 is a flow chart of exemplary steps for imaging light from a light source in accordance with aspects of the present invention.

FIG. 3 depicts a flow chart 300 of exemplary steps for imaging light. The exemplary steps are described below with reference to the imaging apparatus 100 of FIG. 1. At block 302, the photon converter 108 collects light 102.

At block 304, the photon converter 106 converts the light collected in the step of block 302 into an electrical charge signal.

At block 306, the electron multiplication device 110 multiplies the electrical charge signal to produce a plurality of electrical charge signals. The electrical charge signal may be progressively multiplied by multiplying the electrical charge signal (e.g., with a first electron multiplication segment 112a) to produce the electrical charge signal with a first level of gain, multiplying the electrical charge signal with the first level of gain (e.g., with a second electron multiplication device 112b) to produce the electrical charge signal with a second level of gain, and so on. One of the plurality of electrical charge signals may be the original electrical charge signal without any gain.

At block 308, the voltage converters 115 convert the electrical charge signals to voltage signals. In an exemplary embodiment, each voltage converter 115 is coupled to a respective one of the plurality of taps 114/116 to convert electrical charge signals generated at each tap 114/116 into a respective voltage signal representing the collected light.

Optionally, at block 310, the processor 120 selects one or more of the voltage signals, e.g., via the selector 118, for development into an output signal. In an exemplary embodiment, the processor generates a control signal that instructs the selector 118 to select one or more of the voltage signals. The processor 120 may generate the control signal based on a desired signal to noise ratio and/or on a desired dynamic range. Multiple voltage signals may be selected to develop an output signal with improved low light performance and more dynamic range than is possible with a single voltage signal.

At block 312, the processor 120 develops an output signal representing the collected light from one or more of the voltage signals. In an exemplary embodiment, the processor 120 develops the output signal from the one or more voltage signals selected by the selector 118 in the step of block 310. In an alternative exemplary embodiment, the processor 120 develops the output signal from one or more voltage signals received directly from the voltage converters 115.

Figure 4:
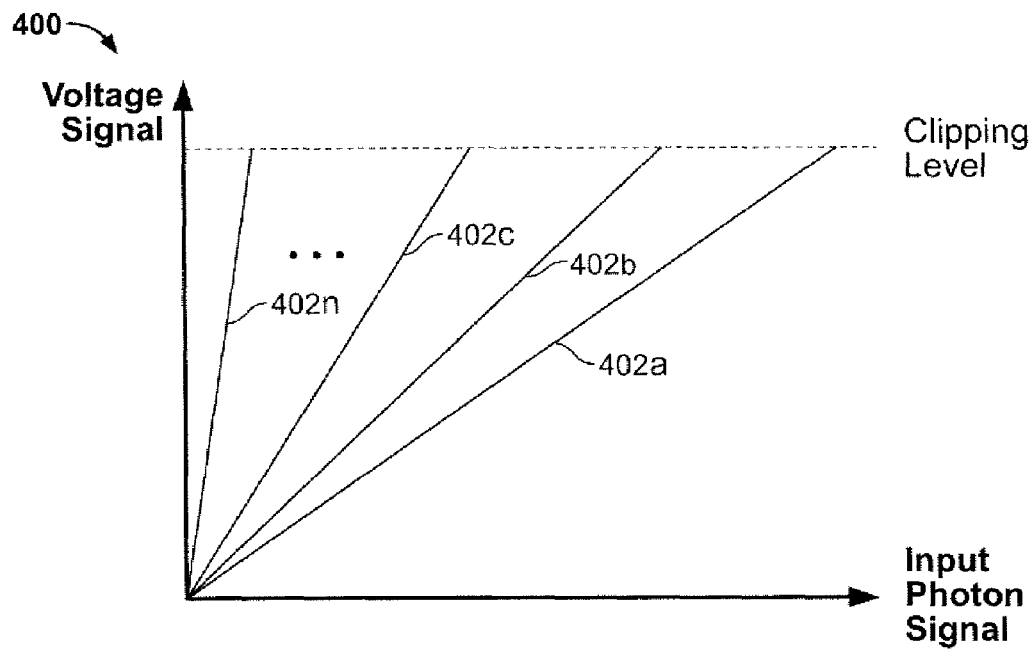
FIG. 4 is a graph illustrating signal voltage versus input photon signal for an imager within the imaging apparatus of FIG. 1.

FIG. 4 is a graph 400 depicting an output voltage signal developed by various multiplication segments of the imager 101 (FIG. 1) versus an input photon signal. A first line 402a represent an output voltage signal developed from an electrical charge from the first tap 114 (i.e., no multiplication). A second line 402b represent an output voltage signal developed from an electrical charge from the second tap 116a (i.e., multiplication by one electron multiplication segment). A third line 402c represent an output voltage signal developed from an electrical charge from the third tap 116b (i.e., multiplication by two electron multiplication segments). A fourth line 402n represent an output voltage signal developed from an electrical charge from the last tap 116n (i.e., multiplication by each electron multiplication segment), which is the result that would be expected from an imager with a non-segmented electron multiplication device.

Figure 5:
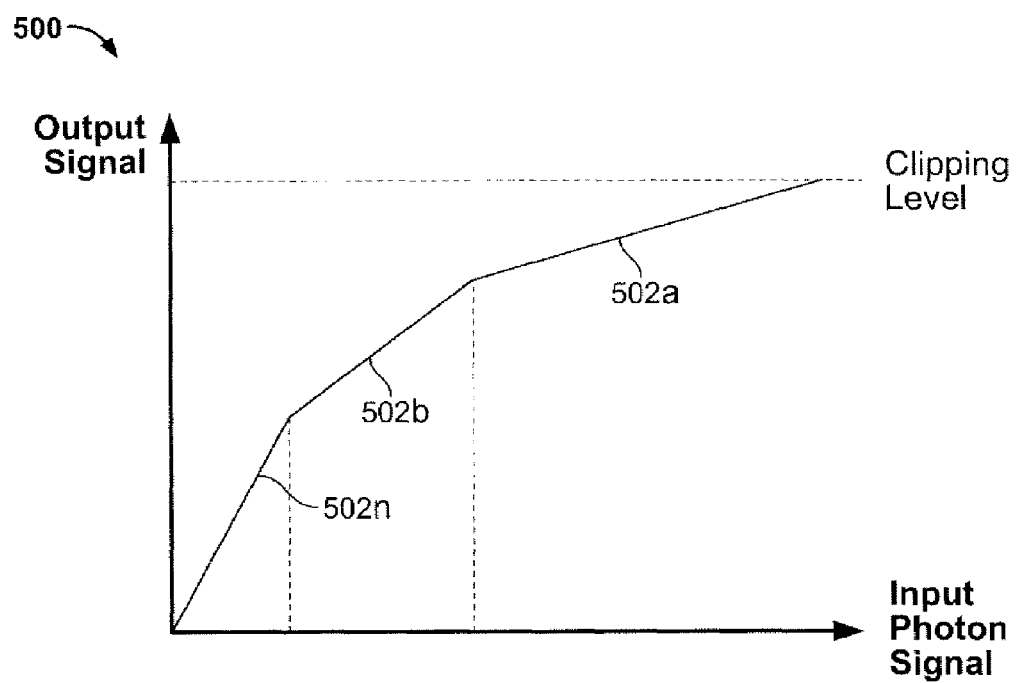
FIG. 5 is a graph illustrating output signal versus input photon signal for the imaging apparatus of FIG. 1.

FIG. 5 is a graph 500 depicting the output signal of the imaging apparatus 100 (FIG. 1) versus input photon signal. A first line segment 502a represent an output signal developed from an electrical charge from the first tap 114 (i.e., no multiplication). A second line segment 502b represent an output signal developed from the combined electrical charge from the second tap 116a (i.e., multiplication by one electron multiplication segment) and the third tap 116b (i.e., multiplication by two electron multiplication segments). A third line segment 502n represent an output signal developed from an electrical charge from the last tap 116n (i.e., multiplication by each electron multiplication segment). As can be seen from FIG. 5, the use of multiple taps allows greater dynamic range to be achieved while maintaining the same low light level detection capabilities as an imager with a non-segmented electron multiplication device.

The present invention may be used to improve the dynamic range of imagers. Multiplying the electrical charge and producing the electrical charge with different levels of gain at taps enables an imager to image relatively low levels of light to relatively high levels of light with minimal signal degradation. For example, assuming a relatively low level of light (e.g., a single photon or electron), a tap providing the electrical charge with a relatively high level of gain may be selected. Conversely, for a relatively high level of light, which would be clipped with a high level of gain, a tap providing the electrical charge with little gain, or no gain, may be selected. Thus, the present invention may be used to design imagers capable of operating in environments with relatively low and relatively high light levels. Combining this progressive multiplication with a photon counter having an extended dynamic range further increases the dynamic range achievable with an imager. Further, the signal-to-noise ratio throughout the dynamic range is improved at all signal levels. The present invention may be used in overhead surveillance and inspection systems, for example.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An imaging apparatus that images light, the apparatus comprising:
   a semiconductor-based photon converter that collects light and converts the collected light into electrical charge;
   a charge coupled device (CCD) based electron multiplication device that operates by impact ionization and is coupled to the photon converter that multiplies the electrical charge, the electron multiplication device associated with a plurality of taps, each tap producing the electrical charge with an associated level of gain;
   a plurality of voltage converters coupled to the plurality of taps associated with the electron multiplication device, each voltage converter coupled to a respective one of the plurality of taps to generate a respective voltage signal representing the collected light; and
   a processor selectively coupled to at least two of the plurality of voltage converters for selectively combining the analog voltage signals output by the at least two of the plurality of voltage converters so as to produce an overall output signal corresponding to an output voltage versus input photon signal characteristic that has at least one break point beyond which the output of one of the at least two analog voltage signals clipped while the other of the two continues to grow, and beyond which the slope of the characteristic decreases the clipped signal remaining as a DC offset in the overall out signal.

2. The apparatus of claim 1, further comprising: a selector that selects the at least two voltage converters and couples the selected at least two voltage converters to the processor.

3. The apparatus of claim 2, wherein the selector selects the at least two voltage converters in response to a control signal and the processor generates the control signal based on a desired signal-to-noise ratio.

4. The apparatus of claim 2, wherein the selector selects the at least two voltage converters in response to a control signal and the processor generates the control signal based on the desired dynamic range.

5. The apparatus of claim 1, wherein the electron multiplication device includes an input terminal, one of the plurality of taps is coupled to the input terminal, and the gain associated with the one of the plurality of taps is unity.

6. The apparatus of claim 1, wherein the electron multiplication device comprises a plurality of electron multiplication segments.

7. The apparatus of claim 6, wherein the plurality of electron multiplication segments are connected in series and are separated by one or more of the plurality of voltage converters and wherein the one or more voltage converters are non-destructive readout devices.

8. The apparatus of claim 1, wherein the electron multiplication device comprises:
  a first electron multiplication segment having an input terminal and an output terminal, the input terminal of the first electron multiplication segment being coupled to the photon converter; and
  a second electron multiplication segment having an input terminal and an output terminal, the input terminal of the second electron multiplication segment being coupled to the output terminal of the first electron multiplication segment.

9. The apparatus of claim 8, wherein the first electron multiplication segment includes one or more electron multipliers and the second electron multiplication segment includes one or more electron multipliers.

10. The apparatus of claim 8, wherein at least two of an output terminal of the photon convener, the output terminal of the first electron multiplication segment, or the output terminal of the second electron multiplication segment are each associated with a respective one of the plurality of taps.

11. The apparatus of claim 1, wherein the photon converter is a time delay and integrate (TDI) array.

12. The apparatus of claim 11, wherein the TDI array is an extended dynamic range (XDR) device.

13. The apparatus of claim 1, wherein the photon converter is a starring array.

14. A method for imaging light, the method comprising the steps of:
  collecting light;
  converting the collected light into an electrical charge signal using a semiconductor-based photon converter;
  multiplying the electrical charge signal by means of impact ionization using a CCD based electron multiplication device to produce a plurality of electrical charge signals with associated levels of gain;
  converting the plurality of electrical charge signals into respective analog voltage signals; and
  selectively combining at least two of the analog voltage signals so as to produce an overall output signal corresponding to an output voltage versus input photon signal characteristic that has at least one break point beyond which the out of one of the at least two analog voltage signals is clipped while the other of the two continues to grow, and beyond which the slope of the characteristic decreases, the clipped signal remaining as a DC offset in the overall output signal.

15. The method of claim 14, wherein the selectively combining step comprises selecting the at least two of the analog voltage signals based on signal-to-noise ratio.

16. The method of claim 1, wherein the selectively combining step comprises selecting the at least two of the analog voltage signals based on dynamic range.

17. The method of claim 14, wherein the multiplying step comprises the steps of: multiplying the electrical charge signal to produce a first electrical charge signal with a first level of gain; and multiplying the first electrical charge signal to produce a second electrical charge signal with a second level of gain.

18. The method of claim 17, wherein the step of convening the plurality of electrical charge signals into respective voltage signals comprises: converting one or more of the electrical charge signal, the first electrical charge signal, and the second electrical charge signal into the respective voltage signals.

19. The apparatus of claim 1, wherein the semiconductor-based photon converter is a charge coupled device.

* * * * *

UNITED STATES PATENT AND TRADEMARK OFFICE
CERTIFICATE OF CORRECTION

| | |
|---|---|
| PATENT NO. | : 7,378,634 B2 |
| APPLICATION NO. | : 11/189650 |
| DATED | : May 27, 2008 |
| INVENTOR(S) | : John Robertson Tower and Peter Alan Levine |

It is certified that error appears in the above-identified patent and that said Letters Patent is hereby corrected as shown below:

Col. 6 line 56 change "out" to read --output--.

Signed and Sealed this

Twenty-ninth Day of July, 2008

JON W. DUDAS
*Director of the United States Patent and Trademark Office*